United States Patent [19]
Kinoshita et al.

[11] Patent Number: 5,801,904
[45] Date of Patent: *Sep. 1, 1998

[54] ACTUATOR ARM WITH MAGNETIC FLUX RESPONSE TO BIAS ARM TO A STOP POSITION

[75] Inventors: Yoshihiko Kinoshita, Hiratsuka; Hiroshi Nishida, Naka-gun; Tatsuya Ishigaki, Yokohama; Kenjiro Kai, Chigasaki; Atsushi Ito, Ashigarakami-gun, all of Japan

[73] Assignee: Hitachi Ltd., Tokyo, Japan

[*] Notice: The term of this patent shall not extend beyond the expiration date of Pat. No. 5,541,792.

[21] Appl. No.: 641,746

[22] Filed: May 2, 1996

Related U.S. Application Data

[63] Continuation of Ser. No. 375,164, Jan. 18, 1995, Pat. No. 5,541,792, which is a continuation of Ser. No. 16,533, Feb. 11, 1993, abandoned.

[30] Foreign Application Priority Data

Mar. 18, 1992 [JP] Japan .................................. 4-061779

[51] Int. Cl.$^6$ .................................................. G11B 5/54
[52] U.S. Cl. .................................... 360/106; 360/105
[58] Field of Search ................................ 360/105, 106

[56] References Cited

U.S. PATENT DOCUMENTS

| | | | |
|---|---|---|---|
| 5,023,736 | 6/1991 | Kelsic et al. | 360/105 |
| 5,051,669 | 9/1991 | Hsiao et al. | 360/106 X |
| 5,119,253 | 6/1992 | Kotani | 360/106 |
| 5,124,867 | 6/1992 | Kitahori et al. | 360/105 |
| 5,170,300 | 12/1992 | Stefansky | 360/105 |
| 5,189,577 | 2/1993 | Nishida et al. | 360/106 |
| 5,541,792 | 7/1996 | Kinoshita et al. | 360/106 |

FOREIGN PATENT DOCUMENTS

| | | |
|---|---|---|
| 61-269275 | 11/1986 | Japan . |
| 62-245579 | 10/1987 | Japan . |
| 2-214076 | 8/1990 | Japan . |
| 3-86982 | 4/1991 | Japan . |

*Primary Examiner*—Stuarts S. Levy
*Assistant Examiner*—William R. Korzuch
*Attorney, Agent, or Firm*—Fay, Sharpe, Beall, Fagan, Minnich & McKee

[57] ABSTRACT

A magnetic disk apparatus wherein a magnetic member mounted on a bobbin made of a non-magnetic material is disposed at a specific position effective for the full range of movement of a transducer head such that the magnetic member and thus the head is attracted by the leakage flux in a VCM, and the attracting force thus derived has a component that produces a rotation moment in only one direction around the pivot axis of the head to bias the head toward a non-data portion of a data storage disk.

18 Claims, 4 Drawing Sheets

ACTUATOR ARM WITH MAGNETIC FLUX RESPONSE TO BIAS ARM TO A STOP POSITION

This is a continuation application of U.S. Ser. No. 08/375,164, filed Jan. 18, 1995, now U.S. Pat. No. 5,541,792, which is a continuation application of Ser. No. 08/016,533, filed Feb. 11, 1993, now abandoned.

BACKGROUND OF THE INVENTION

The present invention relates to a data storage apparatus, and in particular it relates to magnetic head retraction for a rotary actuator type magnetic disk apparatus.

Various methods have been proposed for moving a magnetic head to a non-data recorded portion of a disk, for example to a shipping region on a magnetic recording disk, and for securing the same at that position when the magnetic recording disk in a magnetic disk apparatus stops its rotation.

When a magnetic recording disk is rotating and a magnetic head is conducting data read/write operation, the magnetic head is not usually in direct contact with the magnetic recording disk but floats slightly above the surface of the disk due to an air stream bearing caused by rotation of the disk. However, when the magnetic recording disk stops its rotation, the air stream disappears and the magnetic head comes into contact with the magnetic recording disk. If this contact happens in a data area, recorded data may be destroyed. Therefore, whenever the magnetic recording disk stops its rotation, the magnetic head should be moved to the shipping or non-data recorded region and secured at that position, that it should undergo a retracting operation.

Japanese Patent Laid-open Nos. 269275/1986 and 86982/1991 relate to the force of a coil spring and a leaf spring, respectively, applied in one direction to an actuator to cause the magnetic head to be moved to a predetermined position on the magnetic recording disk. These devices require valuable space for installation and increase the number of components. The coil spring produces oscillation of the head when it should be at rest, which will produce a lot of harmful debris and may eventually break the spring. The leaf spring has a short life span due to repeated bending over a wide range.

Further, for securing the magnetic head in the shipping region, Japanese Patent Laid-open No. 245579/1987 secures the actuator in the shipping region by magnetic attraction using a special-purpose permanent magnet, which can deteriorate over time to change the accuracy of movement by the VCM and which increases space requirements and complexity due to its location and mounting hardware. Also bias is only effective after the head reaches the shipping region, not throughout the range movement. Further, a permanent magnet is not desirable because oxidation occurs and produces harmful oxide dust. Reliability is bad because changes in polarity can occur due to high intensity leakage flux from the VCM.

SUMMARY OF THE INVENTION

It is an object of the present invention to analyze prior retraction and securement systems for magnetic disk apparatus to determine problems, to determine causes of such problems and to provide full or partial solutions to such problems.

According to the prior art which uses a coil spring to move a magnetic head to a predetermined position, a cumbersome procedure is involved to cram the spring into a limited space in an already compact magnetic disk apparatus, further there arises a problem that the number of components increases. In addition, a lot of debris (e.g. of the spring material or plated material) is generated by reciprocating contact between the head and disk due to compression wave and torsional oscillation of the coil spring, that is the carriage vibrates, even with resonance, which may eventually break the spring; this occurs even when the head and disk should be relatively immovable at the shipping region. Debris can find its way into the gap between the head and disk causing headcrash. Breakage would prevent access.

Although the problem due to the compression wave or torsional oscillation can be solved by use of a leaf spring, a leaf spring is still inadequate to reduce the number of components, and further a repeated bending of the leaf spring may build up fatigue, resulting in a breakage. Such breaking would make access impossible. Fatigue would occur during customer use and could not be inspected by the manufacturer.

Where an actuator is secured by permanent magnetic attraction only in a shipping region by means of a special-purpose permanent magnet, securing becomes effective only after the actuator has reached this region. Such special purpose magnet has no effect in the data transducing range of movement and cannot move the head to the shipping position. It is impossible for the magnetic head to be moved automatically to a predetermined position on a magnetic recording disk through the full or any portion of the transducing travel range of the magnetic head with such a special purpose magnet. In addition to problems related to limited space for installation and the increased number of components to be installed, there arise still other problems related to deterioration of system reliability due to oxidation of the special-purpose magnet that releases oxide powder and related to changes in magnetic polarity in the special-purpose permanent magnet due to an intense leakage flux from a voice coil motor magnet that affects reliability. Screws and brackets are use to mount the permanent magnet and a reacting plate respectively to the base and the carriage. Changes in polarity affect the attractive or repressive forces and if the affected forces are within the range of transducing such would affect data transducing reliability and adjustment would be impossible.

An object of the present invention is to eliminate the above-mentioned disadvantages. Another object of the invention is to provide a magnetic disk apparatus with a highly reliable head retracting structure that is inexpensive to fabricate and requires a minimum or no additional space of installation.

In order to accomplish the above-mentioned objects, a magnetic disk apparatus according to the preferred embodiment has a magnetic flux responsive member for retracting a magnetic head attached to a coil support of a voice coil motor.

The magnetic flux responsive member effectively biases the magnetic head to be retracted from over a full operative range of its movement. A line drawn between the rotating axis of the head carriage and the center of the magnetic flux responsive member does not coincide with a line drawn perpendicular to magnetic flux density contour lines for leakage flux of the actuator motor except at a nonbiasing position of the magnetic flux responsive member, which non-biasing position is preferably not used. The leakage flux may be leaking between upper and lower permanent magnets or either an upper or lower permanent magnet and a yoke disposed opposite thereto in a voice coil motor actuator.

The magnetic flux responsive member provides a bias for retracting the magnetic head from over the full range of its movement during transducing toward the securement position by a magnetic force vector component that is perpendicular to a line extending from the center position of the magnetic flux responsive member to the center of the carriage axis of rotation to provide a rotation moment with respect to the pivot axis of the carriage, preferably to provide a single common direction bias, most preferably toward the innermost portion on the magnetic recording disk.

Specifically over the full range of movement of the magnetic head, the magnetic member is disposed such that the magnetic flux responsive force vector is perpendicular to magnetic flux density contour lines of the VCM and extends from the center position of the magnetic flux responsive member approximately toward the center of the permanent magnet in the voice coil motor to provide the rotation moment producing force component with respect to the pivot axis of the carriage, whereby the magnetic head is biased to move toward the securement position, preferably toward the inward direction of the magnetic recording disk.

A permanent magnet in the voice coil motor is mounted, corresponding to a full range of movement of the magnetic head, such that a magnetic force vector that is perpendicular to a magnetic flux density contour line extends from the center position of the magnetic flux responsive member approximately toward the center of the permanent magnet of the voice coil motor to provide the magnetic force component that produces a rotation moment with respect to the pivot axle of the carriage, thereby the magnetic head is always biased to move toward one of the outermost or innermost portions on the magnetic recording disk, for rotation of the carriage around the pivot axis.

The bobbin is made of a non-magnetic material and carries the magnetic flux responsive member to allow only the magnetic flux responsive member of the bobbin to be attracted by leakage flux from the permanent magnets in the voice coil motor; the attraction force thus produced has a component that produces a rotation moment to retract the magnetic head to a predetermined stable storage, shipping non-data, non-transducing, or securement position (all such positions are referred to herein as the securement position). Further, because of its simple construction, the number of components required and the production cost is minimized. Because an ordinary magnet flux responsive material can be used most preferably instead of a special-purpose permanent magnet, reliability is ensured.

The neutral force position of the magnetic flux responsive member is preferably not in the full range of movement of the magnetic head. Within the full range of movement the attraction force exerted only upon the magnetic flux responsive member on the bobbin due to the leakage flux from the permanent magnet in the voice coil motor preferably always has a component that provides a rotation moment to move the magnetic head in only one common direction to a single predetermined securement position at the terminal end of the full range of movement by the magnetic head.

The center or neutral position of the magnetic flux responsive member can be disposed arbitrarily relative to the full range of movement of the magnetic head, but is most preferably outside of the range. Thereby, preferably the magnetic head is biased in only one direction (toward either the innermost or outermost portion when a disk is employed) and most preferably toward the innermost portion on the magnetic recording disk.

The magnetic member is preferably mounted at an appropriate height between the upper and lower sides of the VCM permanent magnets or a permanent magnet and a yoke disposed opposite thereto in the voice coil motor, thereby providing a magnetic head retracting structure contained in less installation space than the prior art.

BRIEF DESCRIPTION OF THE DRAWINGS

Further objects, features and advantages of the present invention will become more clear from the following detailed description of preferred embodiments, shown in the drawings, wherein.

DETAILED DESCRIPTION OF THE EMBODIMENTS

Figure 1:
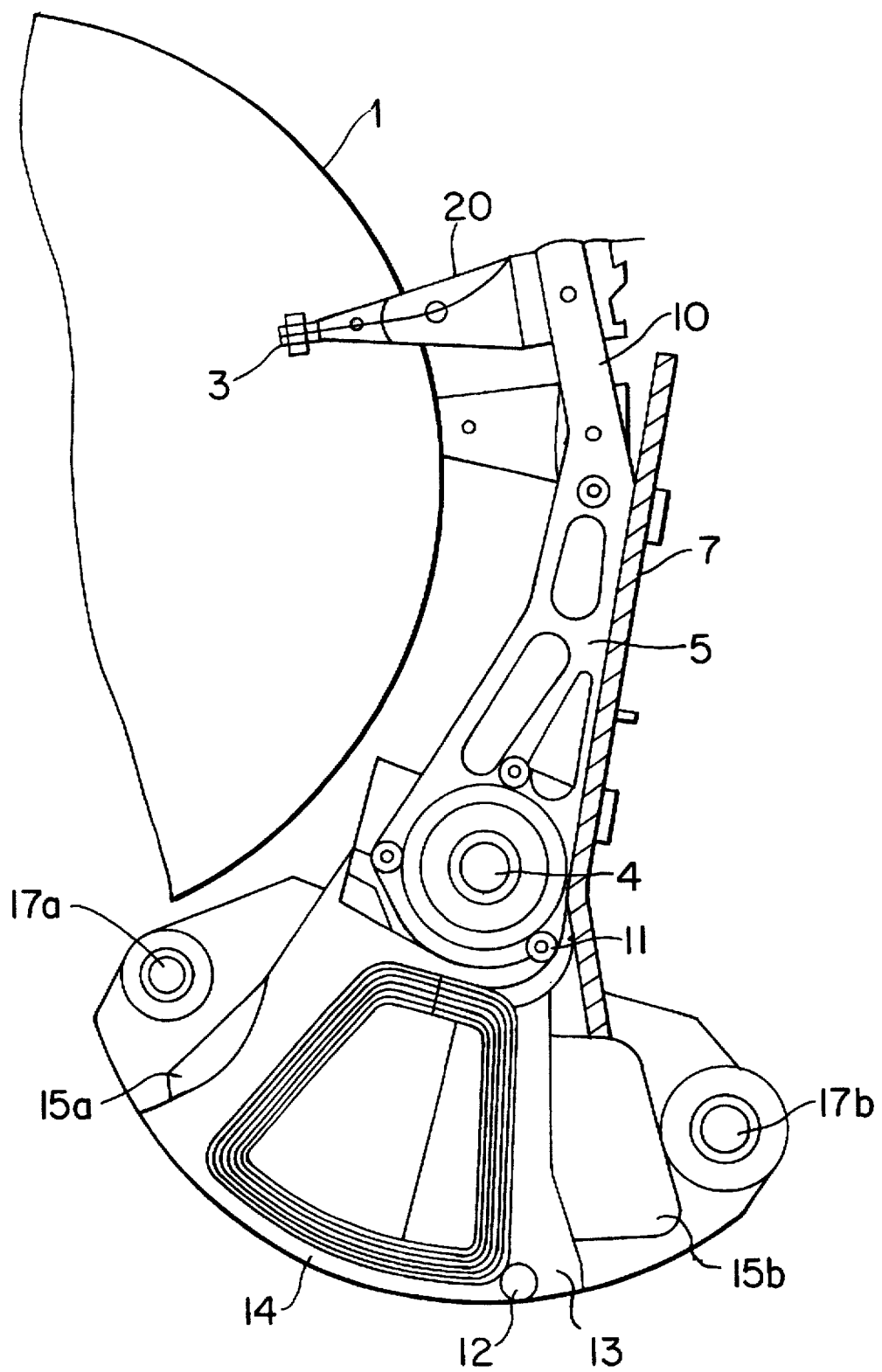
FIG. 1 is a detailed plan view of a portion of a preferred embodiment of the present invention.
Figure 2A:
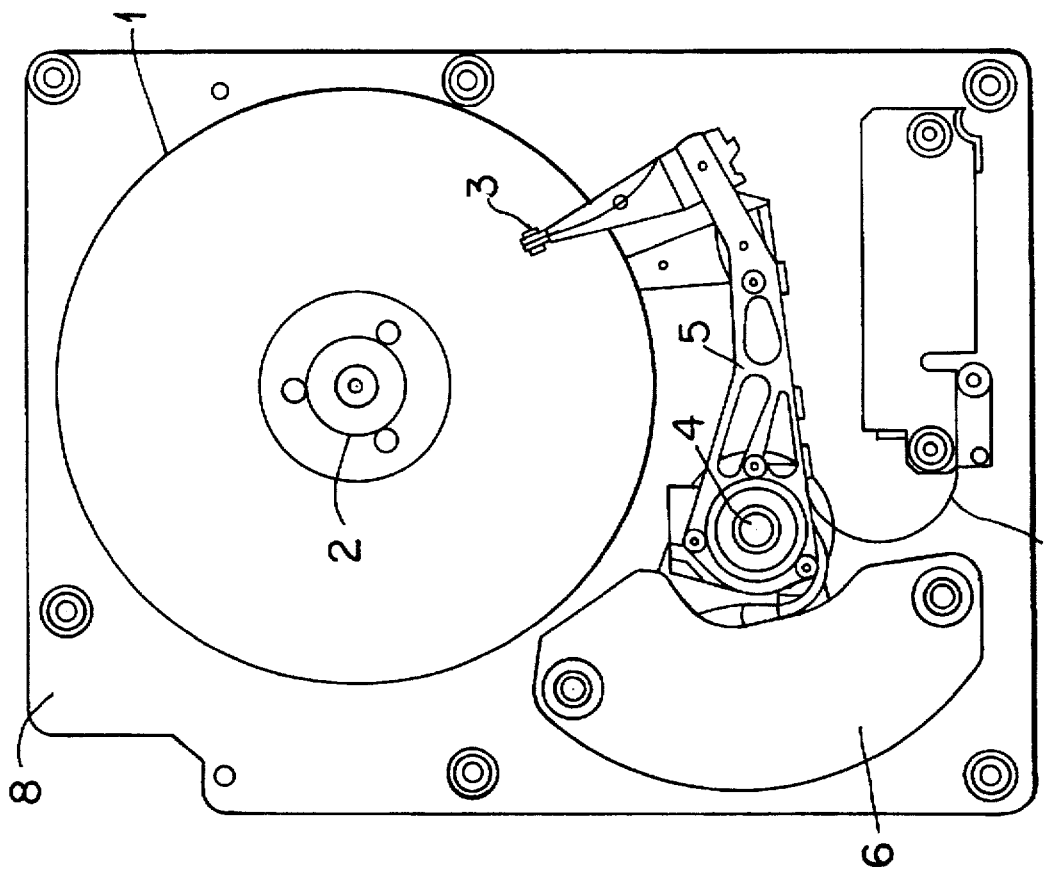
FIG. 2A is a plan view.
Figure 2B:
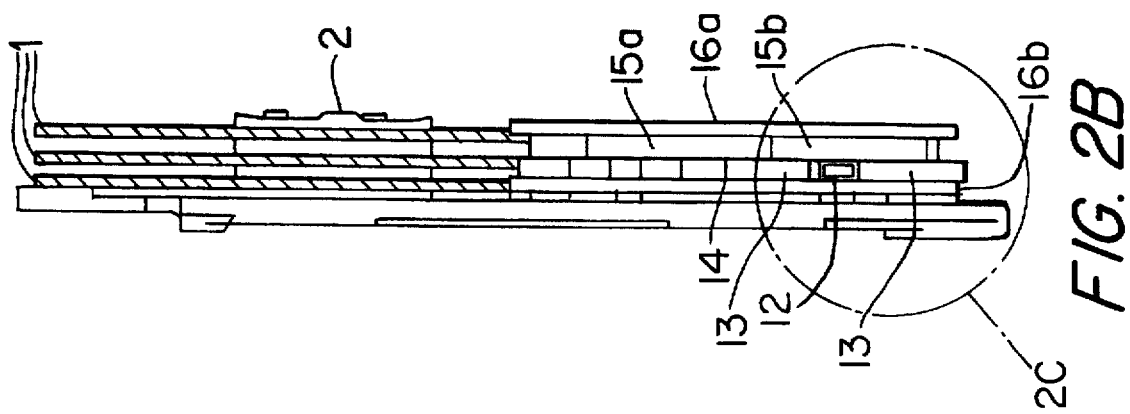
FIG. 2B is a side view.
Figure 2C:
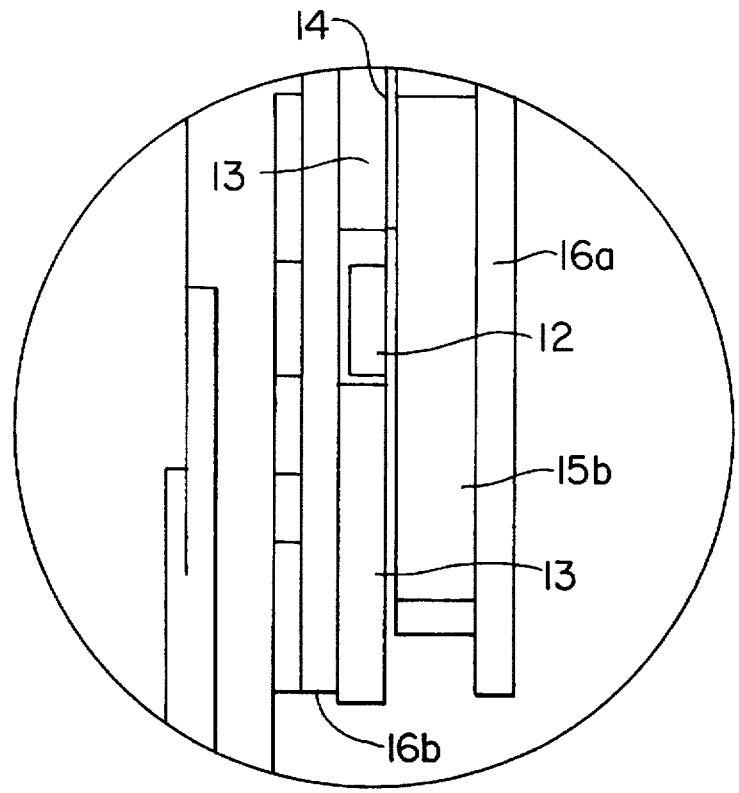
FIG. 2C is an enlarged portion of FIG. 2B, each illustrating the disk apparatus that includes the carriage structure shown in FIG. 1.

A magnetic disk apparatus according to the present invention will be set forth in detail with reference to the accompanying drawings. FIG. 1 shows a schematic diagram illustrating details of a carriage portion of the magnetic disk apparatus of the invention. FIGS. 2A and 2B show plan and side views illustrating the inside arrangement of a head disk assembly (HDA) of the magnetic disk apparatus embodying the invention. With reference to FIGS. 1 and 2, in particular, the HDA constitutes a key mechanical component of the magnetic disk apparatus embodying the invention, and mainly comprises: magnetic recording disk 1 for recording data magnetically thereon; spindle motor 2 for rotating the disk at a constant speed; a magnetic head 3 for reading/writing data on and from the magnetic recording disk 1; carriage 5 for supporting the magnetic head 3, which carriage is mounted pivotable around the pivot axis 4a of pivot bearing 4; carriage or head positioning motor, e.g. voice coil motor 6 (VCM) which pivotally drives the carriage 5 to selectively position the magnetic head 3 on the magnetic recording disk 1 to read/write data; flexible printed circuit (FPC) 7 for transmitting signals from the magnetic head 3 to a signal circuit; and base 8 or the like for mounting all these components.

The carriage 5 includes load spring 20 for supporting the magnetic head 3, head arm 10 and bobbin 13. The bobbin 13 and a plurality of head arms 10, which are firmly fixed together to pivot bearing 4 with screws 11. The bobbin 13, which firmly secures coil 14, partially constituting a voice coil motor, is preferably made of a non-magnetic material, such as synthetic plastic or the like. Magnetic flux responsive member 12 for retracting the magnetic head to a rest position, securement, shipping or non data is provided on part of the bobbin 13. The magnetic flux responsive member 12 may be a permanent magnet but is preferably not a magnet but either a ferromagnetic (produces an attractive force in a strong magnetic field) or anti-ferromagnetic (produces a repulsion force in a strong magnetic field) material. Permanent magnets 15a and 15b of the VCM are disposed in a plane opposed and parallel to a plane of the coil 14, namely in the frontal surface direction of FIG. 1, and which magnets 15a, 15b in conjunction with yokes 16a and 16b form a magnetic circuit for the coil 14 of the VCM 6.

Figure 3:
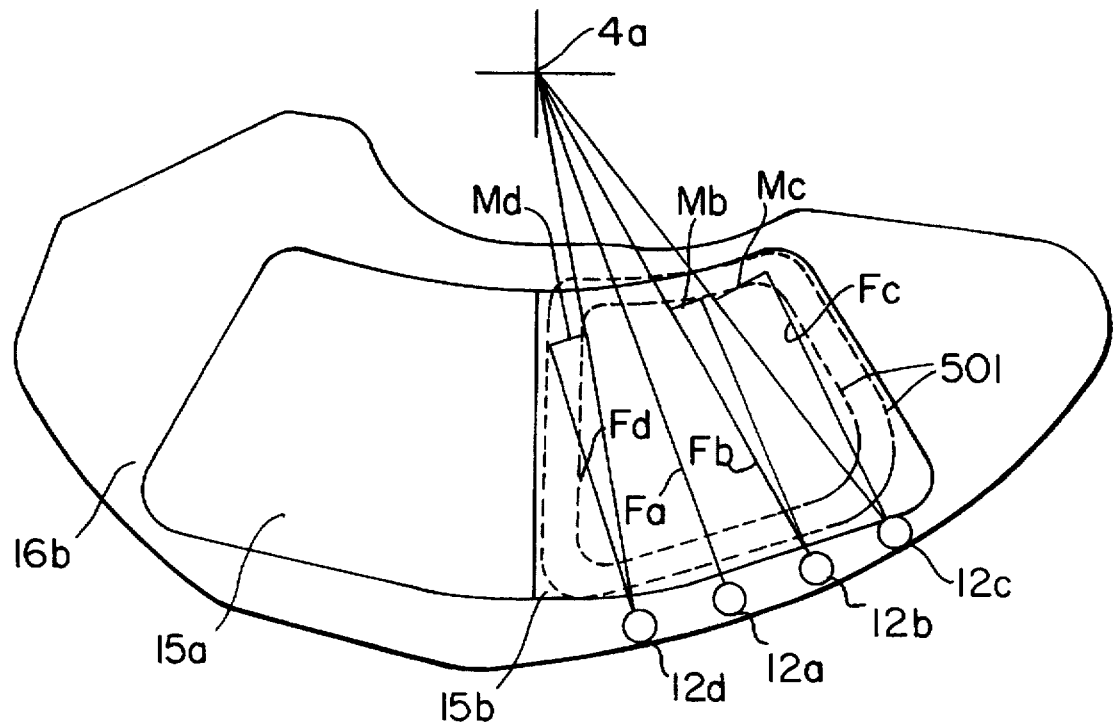
FIG. 3 is a schematic drawing illustrating the principles of the operation of the preferred embodiment of FIGS. 1 and 2, with respect to four different positions of the carriage and use of a ferromagnetic flux responsive member.

In the magnetic disk apparatus according to the FIGS. 1–3 embodiment of the present invention, magnetic flux perpendicular to the plane of the drawing (i.e., in the axial direction of the pivot bearing 4) is generated in a so-called VCM gap, i.e., between permanent magnets 15a, 15b of VCM 6, and the yoke 16b disposed on the opposite side of the coil 14 from the magnets 15a, 15b. This magnetic flux density is expressed by contour lines 501 (two being shown) in FIG. 3, which are concentrically formed approximately along the periphery of the permanent magnets, 15a or 15b. The magnetic flux density becomes greater as it approaches the center of the permanent magnets. The magnetic flux responsive member 12 has a degree of freedom only in the plane direction (i.e., perpendicular to the rotating axis of the pivot bearing 4) and is placed in the vicinity of the contour lines, to generate a force acting upon the magnetic flux responsive member 12 in a direction perpendicular to the magnetic flux density contour line and perpendicular to the axial direction of axis 4a. Thereby the magnetic flux responsive member 12 is magnetically biased by a component of the generated force to a rest position, preferably to where the magnetic force is greatest, relative to the permanent magnets 15a, 15b.

With reference to FIG. 3, various positions of the magnetic flux responsive member 12 are shown according to one degree of freedom to rotate around the center of the pivot axis 4a of pivot bearing 4, and as described above each of these positions generates a force perpendicular to magnetic flux density contour lines 501, that is perpendicular to the periphery of the permanent magnets 15A, 15B, which force acts upon the magnetic flux responsive member 12. At position 12b, for example, force Fb acts upon the magnetic flux responsive member 12, which force Mb has a component tangential to axis 42 to thereby produce a counterclockwise rotation moment around the pivot axis 4a of the pivot bearing 4. As a result, the magnetic flux responsive member 12 at position 12b is caused to move counterclockwise around the pivot axis 4a of the pivot bearing 4. Further, at position 12c, force Fc acts upon the magnetic flux responsive member 12, thus producing a counterclockwise rotation moment causing force component Mc around the pivot axis 4a of the pivot bearing 4. Thereby the magnetic flux responsive member 12 at position 12c is magnetically biased to move counterclockwise around the pivot 4a of the pivot bearing 4. However, at position 12a, although force Fa acting upon the magnetic flux responsive member 12 is generated, the direction of force Fa is aligned with the pivot axis 4a of the pivot bearing 4, thus at this center neutral position, no rotation moment is generated. As a result, the magnetic flux responsive member 12 at position 12a is not biased from its position. Furthermore, at position 12d, force Fd acts upon the magnetic flux responsive member 12, generating a clockwise rotation moment caused by force component Md around the pivot axis 4a of the pivot bearing 4. As a result, in contrast to the above, the magnetic flux responsive member 12 at position 12d is biased to move clockwise around the pivot axle 4a of the pivot bearing 4.

Generally, during the rotation of the magnetic disk 1, magnetic head 3 floats slightly above the surface of magnetic recording disk 1 over its data area within an operative range of movement for transducing to read and/or write data from and to the disk 1 under position control of the VCM.

When the magnetic disk apparatus halts its operation, the magnetic head 3 comes into contact with the magnetic recording disk 1, and slides thereon until it comes to a stop. Irrespective of where it first comes into contact with the magnetic disk 1 after rotation of the disk 1 slows or stops, VCM position control ceases and the magnetic head 3 is biased to move toward and stop finally at a rest or shipping position as determined by interaction forces Ma–Md between permanent magnet 15b and magnetic flux responsive member 12 and the force of an abutment limiting movement. By setting this abutment for the magnetic head 3 to coincide with a shipping region or non data region on the magnetic disk 1 (the most preferred region corresponds to an innermost position on the magnetic disk 1 in this embodiment of the invention), the magnetic head 3 can be retracted to a rest or securement or shipping position whenever the magnetic disk halts its rotation due to the magnetic bias of the magnetic flux responsive member 12.

In FIG. 1, magnetic flux responsive member 12 is firmly bonded on bobbin 13 such that the innermost position for the magnetic head 3 corresponds to the position 12c for the magnetic flux responsive member, and such that the outermost position for the magnetic head corresponds to the position 12d. By such arrangement, a rotation moment produced by forces Mb–Mc in a counterclockwise direction for rotating the magnetic head 3 around the pivot axis 4a of the pivot bearing 4 is always generated effectively in the full range of movement of the magnetic head 3 between positions 12b and 12c. Thereby, when the magnetic disk 1 halts its rotation, the magnetic head 3 moves to the counterclockwise shipping region located at the innermost portion on the magnetic disk 1 where magnetic flux responsive member 12 is at position 12c. Further, when the magnetic head 3 moves to the innermost portion on the disk, bobbin 13 on the carriage 5 bumps against fixed IN stopper or abutment 17b. Thereby the magnetic head at the innermost position is stopped and held or secured stably at rest by the largest magnetic moment producing force component Mc.

By way of one example of the invention, the innermost position on the disk has been specified as a shipping region. It should be understood, however, that the magnetic head 12 can be held at rest in the vicinity of the outermost periphery of the disk by repositioning the magnetic flux responsive member 12 or shaping the carriage 5 to have a range of movement to include positions of the magnetic flux responsive member 12 only to the left of position 12a and to have the bobbin 13 abutting OUT stopper or abutment 17a at the position 12d.

Figure 4:
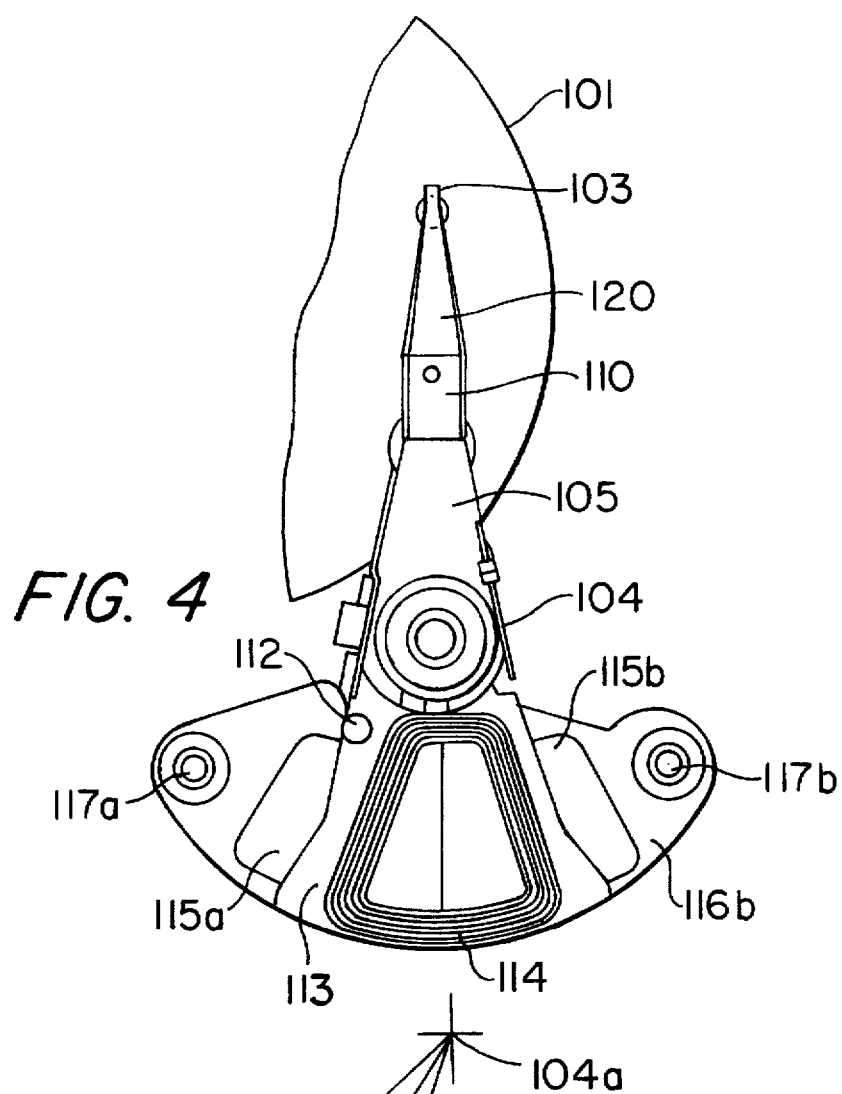
FIG. 4 is a plan view, similar to FIG. 1, but of a second embodiment of the present invention.

FIG. 4 is a diagrammatical illustration of the second embodiment of the invention. With reference to FIG. 4, carriage 105 incorporates a head arm 110 for supporting magnetic head 103 with load spring 120 and a bobbin 113 in an integral construction. Further, magnetic flux responsive member 112 (in contrast to the embodiment of FIG. 1 where the magnetic flux responsive member 12 is outside the permanent magnets 15a, 15b in VCM 6, as viewed from the pivot axis 4a) is disposed inside of permanent magnets 15a, 15b, i.e., toward the pivot axis 104a. The coil 114 and stops or abutments 117a, 117b perform functions corresponding to the functions of coil 14 and stops 17a, 17b.

Figure 5:
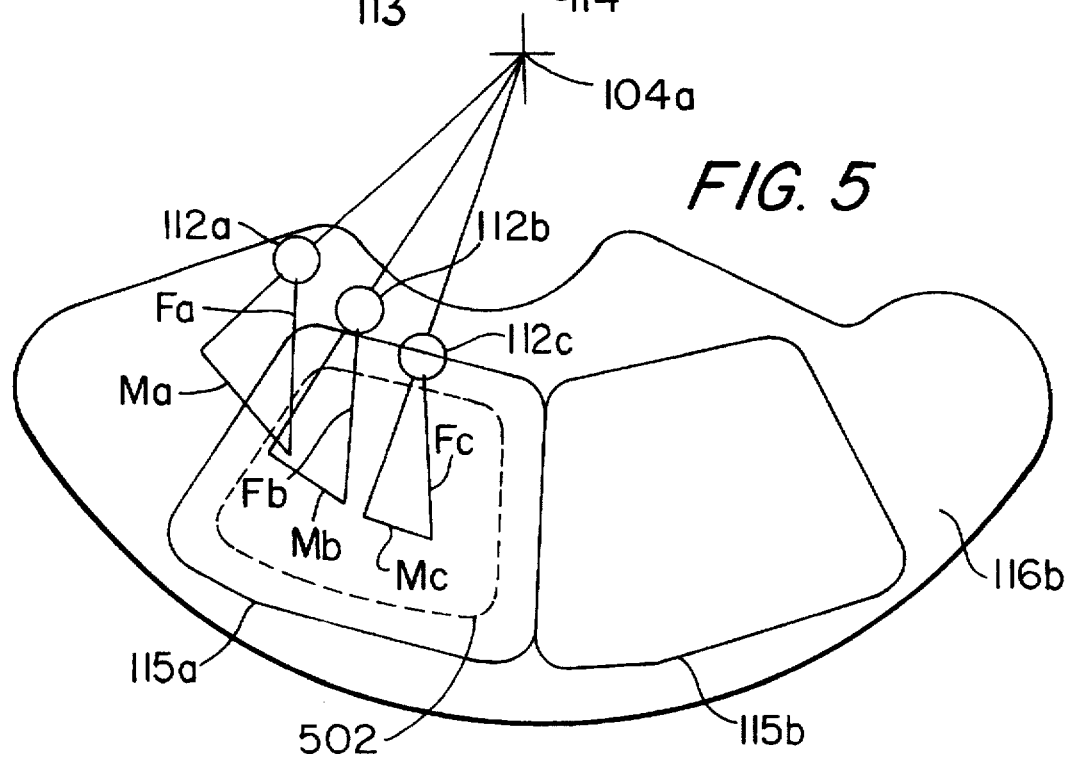
FIG. 5 is a schematic plan view, similar to FIG. 3, but illustrating the principles of the second embodiment of FIG. 4 with respect to three different carriage positions for a ferromagnetic member.

In FIG. 5, the magnetic flux responsive member 112 is located at position 112a when the magnetic head 103 is at the outermost periphery of the disk with bobbin 113 abutting stop 117a, at position 112b when in an intermediate transducing position, and at shipping position 112c when it is at the innermost portion thereof with bobbin 113 abutting stop or abutment 117b. Forces Fa, Fb, and Fc are each perpendicular to magnetic flux density contour lines 502 generated by magnet 115a (i.e. perpendicular to the periphery of VCM magnet 115a), to act upon the magnetic flux responsive member 112 at each position. Further these forces Fa, Fb and Fc produce components of counterclockwise rotation moment forces Ma, Mb, and Mc around the pivot axis 104a of a pivot bearing 104, which in turn cause the magnetic flux responsive member 112 to rotate counterclockwise around the pivot axis 104a. As a result, the magnetic head 103 is moved to the shipping region on the magnetic disk 101 at position 112c from anywhere in the full range of movement between the outermost periphery and the innermost periphery thereof.

With ferromagnetic or antiferromagnetic magnetic flux responsive members cooperating with permanent magnets of the VCM, the bias to the securement position will always be present, through it is overcome by the VCM.

The following materials for the magnetic flux responsive member can be useful for the present invention.

Ferromagnetic member (12, 112):

CoPt, Cobalt-ferrite ($CoFe_2O_4$), $CrO_2$, CrTe, Aluminum-alloy ($Cu_2MnAl$), $Fe_3C$, FeCo, magnetite ($Fe_3O_4$), $FeNi_3$, $Mn_4N$, $Mn_2Sb$, nickel-ferrite ($NiFe_2O_4$), $Ni_3Mn$, yttrium-iron-garnet ($Y_3Fe_5O_{12}$)

Anti-ferromagnetic member (not shown in figures):

Co), $Cr_2O_3$, CrSb, Cr, $\alpha Fe_2O_3$, MnTe, NiO

The magnetic head 3, irrespective of where it first comes into contact with the magnetic disk 1, is caused to start to move and should stop finally at a shipping region.

By setting the magnetic flux responsive member 12, 112 on carriage 5 so that the magnetic head 3 would be biased by magnetic interaction forces for rotating moment in the direction of a shipping region over all the area or range in which the magnetic head 3 can move outside the shipping region on the magnetic disk 1 (the innermost position on the magnetic disk 1 in this embodiment of present invention), the magnetic head 3 would start to be retracted to a shipping position whenever the magnetic disk halts its rotation.

Further, although not preferred, the magnetic head 3 is caused to stop finally at a position where interaction forces between permanent magnet 15b and the magnetic flux responsive member 12, 112 are equally balanced. The stop position is preferably where the force on the magnetic flux responsive member 12, 112 is greatest. By setting the balance stop position for the magnetic head 3 to be outside the range of movement, the magnetic head 3 is retracted to the shipping position and can rest.

By setting the magnetic flux responsive member 12, 112 on carriage 5 so that the magnetic interaction forces (not those of the VCM) on the carriage constantly increase the rotating moment in the direction of a shipping region in all areas in which the magnetic head 3 can move including the shipping region on the magnetic disk 1 and further by arranging stopper (IN stopper 17b in this embodiment of present invention) so that the coil support bobbin moving into said shipping region should be stopped, the magnetic head 3 starts to be retracted to a shipping position whenever the magnetic disk halts its rotation.

The magnetic disk apparatus according to the present invention comprises a bobbin made of a non-magnetic member and a magnetic flux responsive member disposed on part of the bobbin, so that the magnetic flux responsive member and thereby the bobbin are attracted by the leakage magnetic flux from the permanent magnet in the voice coil motor, and thereby the magnetic head is biased to move to a predetermined rest or shipping position on the disk by the above attraction force.

Further, because of its simplified construction and the reduced number of components, an improved reliability of system operation and a lower cost of manufacture have been attained; without requiring additional magnets as in the prior art on the carriage, according to the preferred embodiment that does not use a magnet but rather uses a ferromagnetic or antiferromagnetic flux responsive member. Also, a retracting structure has been obtained more compactly than the prior art, because the magnetic flux responsive member is at the height of the air gap of the VCM.

While the preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A magnetic disk apparatus, comprising:
   a carriage supporting a magnetic head over a disk for performing read/write operations and pivoting about an axis, the carriage being capable of pivoting over a predetermined range, the predetermined range being such that the magnetic head can be positioned over an entire data recording portion of the disk;
   a yoke supporting a permanent magnet; and
   magnetic means for providing a force causing the carriage to pivot about the axis when read/write operations have been ceased, wherein the force provided is sufficient to move the carriage regardless of its position in the predetermined range;
   wherein the magnetic means for providing a force includes a magnetic member fixed on the carriage and interacting with leakage magnetic flux of the permanent magnet supported by the yoke to bias the carriage in a predetermined direction, the magnetic member moving along a portion of a contour line of the permanent magnet to bias the carriage in the predetermined direction.

2. A magnetic disk apparatus according to claim 1, further comprising a motor for producing a motor force for moving the carriage relative to the disk; and
   wherein the magnetic means for providing a force biases the carriage in the predetermined direction when the motor is not activated.

3. A magnetic disk apparatus according to claim 1, wherein the magnetic disk apparatus includes a disk and wherein the predetermined direction in which the carriage is biased is toward an innermost region of the disk.

4. A magnetic disk apparatus according to claim 3, wherein the magnetic means for providing a force biases the carriage in the predetermined direction such that the magnetic head supported by the carriage is eventually positioned over the disk at a position outside the entire data recording portion when the motor is not activated.

5. A magnetic disk apparatus according to claim 4, further comprising position stops which limit the movement of the carriage.

6. A magnetic disk apparatus having a carriage supporting a magnetic head and pivoting about an axis so as to move the magnetic head over a n entire data recording region of a recording medium, the magnetic disk apparatus also including a yoke supporting a permanent magnet which interacts with a coil of a motor to move the carriage when the coil is activated, the magnetic disk apparatus comprising:

a magnetic member located on the carriage for interacting with leakage magnetic flux of the permanent magnet and causing the magnetic member to move along a contour line of the permanent magnet, thereby moving the carriage in a predetermined direction when the coil is not activated; and wherein the interaction between the magnetic member and the leakage magnetic flux of the permanent magnet is sufficient to move the carriage in the predetermined direction over the entire data recording region when the coil is not activated.

7. A magnetic disk apparatus according to claim 6, wherein when the coil is deactivated, the interaction between the magnetic member and the leakage magnetic flux of the permanent magnet moves the carriage such that the magnetic head supported thereon is moved toward an innermost position of the magnetic recording medium.

8. A magnetic disk apparatus according to claim 7, wherein when the coil is deactivated, the magnetic head is moved to a position outside the entire data recording portion.

9. A magnetic disk apparatus according to claim 8, further comprising position stops which limit the movement of the carriage.

10. A magnetic disk apparatus, comprising:

a carriage supporting a magnetic head and pivoting about an axis, the carriage being capable of pivoting over a magnetic disk for a predetermined range, wherein the predetermined range is such that the magnetic head can be positioned over an entire data recording region of the magnetic disk to perform recording/reproducing;

a yoke supporting a permanent magnet; and magnetic means for providing a force causing the carriage to pivot about the axis when the magnetic head ceases recording/reproducing regardless of the position of the magnetic head in the predetermined range;

wherein the magnetic means for providing a force includes a magnetic member fixed on the carriage and interacting with leakage magnetic flux of the permanent magnet supported by the yoke to bias the carriage in a predetermined direction.

11. A magnetic disk apparatus according to claim 10, further comprising a motor for producing a motor force for moving the carriage relative to the magnetic disk; and wherein the magnetic means for providing a force biases the carriage in the predetermined direction when the motor is not activated.

12. A magnetic disk apparatus according to claim 10, wherein the predetermined direction in which the carriage is biased is toward an innermost region of the magnetic disk.

13. A magnetic disk apparatus according to claim 12, wherein the magnetic disk has a data recording portion and wherein the magnetic means for providing a force biases the carriage in the predetermined direction such that the magnetic head supported by the carriage is eventually positioned over the magnetic disk at a position outside the data recording portion when the motor is not activated.

14. A magnetic disk apparatus according to claim 13, further comprising position stops which limit the movement of the carriage.

15. A magnetic disk apparatus having a carriage supporting a magnetic head and pivoting about an axis so as to move the magnetic head over a recording medium, the magnetic disk apparatus also including a yoke supporting a permanent magnet which interacts with a coil of a motor to move the carriage when the coil is activated, the magnetic disk apparatus comprising:

a magnetic member located on the carriage and interacting with leakage magnetic flux of the permanent magnet, thereby causing the magnetic member to move along a portion of a path defined approximately along a periphery of the permanent magnet, and resulting in the movement of the carriage in a predetermined direction when the coil is not activated; and wherein the interaction between the magnetic member and the leakage magnetic flux of the permanent magnet is sufficient by itself to move the carriage in the predetermined direction when the coil is not activated regardless of the location of the carriage when the coil is deactivated.

16. A magnetic disk apparatus according to claim 15, wherein when the coil is deactivated, the interaction between the magnetic member and the leakage magnetic flux of the permanent magnet moves the carriage such that the magnetic head supported thereon is moved toward an innermost position of the magnetic recording medium.

17. A magnetic disk apparatus according to claim 16, wherein the magnetic recording medium has a data recording portion and wherein when the coil is deactivated, the magnetic head is moved to a position outside the data recording portion.

18. A magnetic disk apparatus according to claim 17, further comprising position stops which limit the movement of the carriage.

* * * * *